United States Patent
Gerst et al.

(10) Patent No.: US 11,787,984 B2
(45) Date of Patent: Oct. 17, 2023

(54) ONE-COMPONENT PRESSURE-SENSITIVE ADHESIVE COMPOSITION HAVING GEL CONTENT BASED ON REVERSIBLE CROSSLINKING VIA METAL SALTS

(71) Applicant: BASF SE, Ludwigshafen am Rhein (DE)

(72) Inventors: Matthias Gerst, Ludwigshafen (DE); Stephan Moebius, Ludwigshafen (DE); Dirk Wulff, Ludwigshafen (DE); Michael Gross, Ludwigshafen (DE)

(73) Assignee: BASF SE (DE)

( * ) Notice: Subject to any disclaimer, the term of this patent is extended or adjusted under 35 U.S.C. 154(b) by 1075 days.

(21) Appl. No.: 16/482,119

(22) PCT Filed: Jan. 2, 2018

(86) PCT No.: PCT/EP2018/050011
§ 371 (c)(1),
(2) Date: Jul. 30, 2019

(87) PCT Pub. No.: WO2018/141489
PCT Pub. Date: Aug. 9, 2018

(65) Prior Publication Data
US 2019/0390091 A1     Dec. 26, 2019

(30) Foreign Application Priority Data
Jan. 31, 2017   (EP) .................................... 17153873

(51) Int. Cl.
| | | |
|---|---|---|
| *C09J 133/10* | (2006.01) | |
| *C08F 2/22* | (2006.01) | |
| *C09J 133/02* | (2006.01) | |
| *C08K 3/011* | (2018.01) | |
| *C09J 133/08* | (2006.01) | |
| *C09J 125/14* | (2006.01) | |
| *C09J 11/08* | (2006.01) | |
| *C09J 7/38* | (2018.01) | |
| *C08K 5/098* | (2006.01) | |

(52) U.S. Cl.
CPC ............ *C09J 133/10* (2013.01); *C08F 2/22* (2013.01); *C08K 3/011* (2018.01); *C09J 7/385* (2018.01); *C09J 11/08* (2013.01); *C09J 125/14* (2013.01); *C09J 133/02* (2013.01); *C09J 133/08* (2013.01); *C08K 5/098* (2013.01); *C09J 2203/334* (2013.01); *C09J 2301/312* (2020.08); *C09J 2301/408* (2020.08); *C09J 2425/00* (2013.01); *C09J 2433/00* (2013.01)

(58) Field of Classification Search
CPC .. C08K 5/09; C08K 5/098; C09J 7/381; C09J 133/02; C09J 133/08; C09J 133/10; C09J 7/38; C09J 7/385
See application file for complete search history.

(56) References Cited

U.S. PATENT DOCUMENTS

| | | | |
|---|---|---|---|
| 2,754,280 | A | 7/1970 | Brown et al. |
| 3,740,366 | A | 6/1973 | Sanderson et al. |
| 4,322,516 | A | 3/1982 | Wiest et al. |
| 4,354,008 | A | 10/1982 | Skoultchi |
| 5,814,685 | A * | 9/1998 | Satake ................. C09D 11/326 525/902 |
| 6,608,134 | B1 | 8/2003 | Tobing et al. |
| 7,070,051 | B2 * | 7/2006 | Kanner ............ A61B 17/06133 206/460 |
| 2008/0033095 | A1 * | 2/2008 | Takahashi .............. C09J 133/08 524/460 |
| 2009/0199965 | A1 | 8/2009 | Wildeson et al. |
| 2017/0073552 | A1 | 3/2017 | Schmid et al. |

FOREIGN PATENT DOCUMENTS

| | | |
|---|---|---|
| CN | 102234491 A | 11/2011 |
| EP | 0 081 083 A2 | 6/1983 |
| JP | 2-251589 A | 10/1990 |
| JP | 3-1 46582 A | 6/1991 |
| JP | 3-229784 A | 10/1991 |
| JP | 5-51565 A | 3/1993 |
| JP | 10-3635 A | 1/1998 |
| JP | 10-69681 A | 3/1998 |
| KR | 101422655 B1 * | 7/2014 |
| WO | 91/02759 A1 | 3/1991 |
| WO | 94/21713 A2 | 9/1994 |

(Continued)

OTHER PUBLICATIONS

Aldrich Data Sheet (Year: 2022).*
Polymerdatabase.com, Glass Transition Temperatures (2015-2022), at http://polymerdatabase.com/polymer%20physics/Polymer%20Tg.html (retrieved Nov. 5, 2022).*
Albert et al., "Pressure sensitive adhesives" Adhesion Science and Engineering, vol. 2, 2002, pp. 465-554.
Czech., et al., "Crosslinking of pressure sensitive adhesive based on water-borne acrylate", Polymer International, vol. 52, Issue 3, Feb. 17, 2003, pp. 347-357.
El-Aasser, et al., "Advances in emulsion polymerization and latex technology", 42nd Annual Short Course, vol. 2, Jun. 6-10, 2011, 8 pages.

(Continued)

*Primary Examiner* — Kregg T Brooks
(74) *Attorney, Agent, or Firm* — Faegre Drinker Biddle & Reath LLP

(57) ABSTRACT

A description is given of a one-component pressure-sensitive adhesive composition in the form of an aqueous polymer dispersion comprising at least one pressure-sensitive adhesive polymer which is formed by emulsion polymerization of soft (meth)acrylic ester monomers, methacrylic acid, and optionally further monomers, where the polymerization takes place in the presence of chain transfer agents or styrene. The pressure-sensitive adhesive polymer has a gel content which is based at least partly on a reversible crosslinking via metal salts. The one-component pressure-sensitive adhesive composition can be used for producing adhesive labels, adhesive tapes or adhesive foils.

15 Claims, No Drawings

(56) References Cited

FOREIGN PATENT DOCUMENTS

WO     WO 2013/117428 A1     8/2013
WO     WO 2015/175911 A1     11/2015

OTHER PUBLICATIONS

Lutz, et al., "Chapter 10.27: Aqueous Emulsion Polymers", Polymer Science: A Comprehensive Reference, ed. Matyjaszewski, et al., vol. 10, 2012, pp. 479-518.
Masa, et al., "High-solids-content seeded semicontinuous emulsion terpolymerization of styrene, 2-ethylhexyl acrylate and methacrylic acid", Polymer, vol. 34, Issue 13, 1993, pp. 2853-2859.
Parvate, et al., "Advances in self-crosslinking of acrylic emulsion: what we know and what we would like to know", Journal of Dispersion Science and Technology, vol. 40, Issue 4, Sep. 28, 2018, pp. 519-536.
Srivastava et al., "Go-polymerization of Acrylates", Designed Monomers and Polymers, vol. 12, Issue 1, 2009, pp. 1-18.
Yan, et al., "Synthesis and characterization of self-crosslinkable zinc polyacrylate latices at room temperature", Iranian Polymer Journal, vol. 21, Issue 9, Jul. 18, 2012, pp. 631-639.
International Search Report dated Mar. 29, 2018 in PCT/EP2018/050011.
Milker, R. et al. "Crosslinking of dispersions of acrylate pressure-sensitive adhesives" Coating, vol. 32, No. 3, 1999, 1 page.
International Search Report dated Jun. 18, 2018 in PCT/EP2018/050011 filed on Jan. 2, 2018.

\* cited by examiner

ONE-COMPONENT PRESSURE-SENSITIVE ADHESIVE COMPOSITION HAVING GEL CONTENT BASED ON REVERSIBLE CROSSLINKING VIA METAL SALTS

The invention relates to a one-component pressure-sensitive adhesive composition in the form of an aqueous polymer dispersion comprising at least one pressure-sensitive adhesive polymer which is formed by emulsion polymerization of soft (meth)acrylic ester monomers, methacrylic acid, and optionally further monomers, where the polymerization takes place in the presence of chain transfer agents or styrene. The pressure-sensitive adhesive polymer has a gel content which is based at least partly on a reversible crosslinking via metal salts. The one-component pressure-sensitive adhesive composition can be used for producing adhesive labels, adhesive tapes or adhesive foils.

Pressure-sensitive adhesives (PSAs) for applications, for example, in adhesive tapes or adhesive foils are available on the basis of polymer solutions in organic solvents and on the basis of aqueous polymer dispersions which are obtainable by emulsion polymerization. There is a desire for increasing the use of aqueous systems and abandonment of organic solvents. However, the adhesive properties of emulsion polymers are not yet equal in every respect to adhesive polymers produced in organic solvents, as reflected in a market share for the solvent-based adhesives of around 50-60%, according to field of application. Solution polymers are in general very largely unbranched and uncrosslinked, have a comparatively high molecular weight, and when coated onto substrates form very homogeneous films of adhesive in which the long polymer chains are able to interloop, leading to comparatively high cohesion. The production process of emulsion polymerization generally entails the formation of polymers having relatively high degrees of branching and of crosslinking (as measurable by the gel content) by comparison with solution polymerization. The filming of emulsion polymers forms heterogeneous films having microscopically visible interfaces, which are attributable to the dispersion particles; the overall effect of this is to reduce the cohesion, by comparison with solvent-based polymers, and to impair the water resistance. Crosslinking or interlooping of polymer chains across the interfaces of the dispersion particles is greatly impaired, so making it difficult to improve the cohesion of PSAs based on emulsion polymers. There is therefore a desire for water-based adhesives with further-improved adhesive properties.

Crosslinking of acrylate adhesive dispersions inter alia with metal salts is described in Coating 3/99, pages 97-102. The acrylate adhesive polymers described have a high gel fraction (65-79%), deriving from covalent, irreversible crosslinking, and comprise acrylic acid as a comonomer. Metal salt crosslinking of aqueous acrylate polymer dispersions is also described in JP 03-229784, JP 02-251589, JP 01-069681, JP 03-146582 and JP-103635. JP 05-51565 describes aqueous polymer dispersions which comprise a metal acetylacetonate enclosed within a wax layer, with the wax layer preventing crosslinking until the wax has melted following application to a substrate.

It was an object of the present invention to provide polymeric PSAs on an aqueous basis, i.e. without organic solvents, which take the form of a stable, one-component composition and exhibit good adhesive properties, especially an improved cohesion.

A subject of the invention is a one-component pressure-sensitive adhesive composition in the form of an aqueous polymer dispersion comprising at least one pressure-sensitive adhesive polymer formed by emulsion polymerization of (i) at least 60 wt %, based on the sum of the monomers, of at least one soft (meth)acrylic ester monomer which when polymerized as a homopolymer has a glass transition temperature of less than 0° C., preferably less than −20° C., (ii) 0.1 to 10 wt %, based on the sum of the monomers, of methacrylic acid, (iii) 0 to 30 wt %, based on the sum of the monomers, of styrene, (iv) optionally further monomers, different from (i) to (iii), where the polymerization takes place in the presence of 0 to 1 part by weight of chain transfer agent per 100 parts by weight of monomers, where if no chain transfer agent is used, the amount of styrene (iii) is at least 5 wt %, where the pressure-sensitive adhesive polymer has a gel content ($gel_{total}$) of at least 40 wt %, based on a polymer film produced from the pressure-sensitive adhesive polymer and dried, where the gel content is based at least partly on a reversible crosslinking by metal salts, and the gel content of the pressure-sensitive adhesive polymer that is based on reversible crosslinking by metal salts ($gel_{reversible}$) is at least 10 wt %, where the metal salts which bring about the reversible crosslinking are used in uncoated form, where the gel content may also be based partly on covalent, irreversible crosslinking, and the gel content of the pressure-sensitive adhesive polymer that is based on covalent, irreversible crosslinking ($gel_{irreversible}$) is 0 to 50 wt %, and where the glass transition temperature of the polymer is less than 0° C., preferably −20° C. or less.

The metal cations of the metal salts are preferably selected from $Al^{3+}$, $Zn^{2+}$, $Ti^{4+}$, $Ca^{2+}$, $Fe^{2+}$, $Fe^{3+}$ and $Zr^{4+}$.

The wt % details for the monomers are based in each case on the sum of all monomers used in the polymerization, unless indicated otherwise.

A PSA (pressure-sensitive adhesive) is a viscoelastic adhesive whose set film at room temperature (20° C.) in the dry state remains permanently tacky and adhesive. Adhesion to substrates is accomplished immediately by gentle applied pressure.

Occasionally in the text below, the designation "(meth) acryl . . . " and similar designations are used as an abbreviated notation for "acryl . . . or methacryl . . . ". In the designation Cx alkyl(meth)acrylate and analogous designations, x denotes the number of carbon atoms in the alkyl group.

A one-component adhesive is an adhesive to which prior to the application no further component is added and which is storage-stable, where on storage for 5 days at 20° C. the change in viscosity is less than 100%, based on the initial viscosity. The proportion of coagulum formation (removable by filtration with a 250 μm mesh-size filter) preferably does not exceed 5 wt %, based on the solids content of the dispersion. The viscosity is measured using a cone/plate rotational viscometer (e.g., rheometer "MCR 301" from Anton Paar, measurement build CP25-1-SN12203) at 23° C., constant shear rate 1 gap width d=0.05 mm.

The glass transition temperature is determined by differential scanning calorimetry (ASTM D 3418-08, midpoint temperature). The glass transition temperature of the polymer in the polymer dispersion is the glass transition temperature obtained on evaluation of the second heating curve (heating rate 20 C/min).

The gel content is measured by producing a polymer film from a polymer dispersion and drying it for a day at room temperature (20° C.) and for 4 days at 50° C. The film is then admixed with 99 times the mass of methyl ethyl ketone and stored at room temperature for 4 days. It is filtered off on a tared 125 μm Perlon filter, and the filter is dried at room temperature until free from solvent and then dried further for an hour at 50° C. The gel fraction is the fraction insoluble in methyl ethyl ketone that is determined by reweighing.

The total gel content ($gel_{total}$) is determined after the addition of metal crosslinker.

The gel content based on covalent, irreversible crosslinking ($gel_{irreversible}$) is determined before the addition of metal crosslinker.

The gel content based on reversible crosslinking via metal salts ($gel_{reversible}$) is the difference between total gel content and irreversible gel content:

$$gel_{reversible} = gel_{total} - gel_{irreversible}$$

Where the crosslinking via metal salts takes place by copolymerization with at least one metal salt monomer having an at least divalent metal cation, the total gel content means the gel content of the polymer with copolymerized metal salt monomer. Where the crosslinking via metal salts takes place by copolymerization with metal salt monomer, the gel content based on covalent, irreversible crosslinking ($gel_{irreversible}$) means the gel content of an otherwise identically prepared polymer without copolymerized metal salt monomer.

The amount of soft (meth)acrylic ester monomer (i) is at least 60 wt %, preferably at least 65 wt %, e.g., from 65 to 99.5 wt % or from 70 to 98 wt % ok. Preferred soft monomers are n-butyl acrylate, 2-ethylhexyl acrylate, and ethyl acrylate. Particularly preferred are n-butyl acrylate, 2-ethylhexyl acrylate, and a mixture thereof.

Methacrylic acid (ii) is used in an amount of 0.1 to 10 wt %, preferably of 0.2 to 8 wt %, or of 0.5 to 8 wt %, or of 0.5 to 6 wt %.

Styrene (iii) is used in an amount of 0 to 30 wt %, e.g., from 5 to 25 wt % or from 5 to 20 wt % or from 10 to 20 wt %. If no chain transfer agent is used, the amount of styrene (iii) is at least 5 wt %, preferably at least 10 wt %.

Optionally it possible to use further monomers (iv), which are different from the monomers (i) to (iii). The further monomers (iv) are copolymerizable, ethylenically unsaturated compounds. The optional monomers (iv) are used preferably in amounts of 0 or less than or equal to 10 wt %, of 0.1 to 10 wt %, of 1 to 10 wt %, or of 1 to less than or equal to 8 wt %, based on the sum of the monomers. The monomers (iv) are preferably selected from the group consisting of C1 to C20 alkyl (meth)acrylates, monomers comprising hydroxyl groups, vinyl esters of carboxylic acids comprising up to 20 carbon atoms, vinyl aromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, and (meth)acrylamides or mixtures of these monomers, different from the monomers (i) to (iii). Further monomers additionally include phenyloxyethyl glycol mono(meth)acrylate, glycidyl(meth)acrylate, aminoalkyl(meth)acrylates such as 2-aminoethyl (meth)acrylate, for example. Alkyl groups have preferably from 1 to 20 carbon atoms. $C_1$-$C_{20}$ alkyl(meth)acrylates have 1-20 carbon atoms in the alkyl groups. $C_1$-C10 hydroxyalkyl(meth)acrylates have 1-10 carbon atoms in the hydroxyalkyl groups.

As monomer (iv) it is also possible to use monomers which contain functional groups that are able to react with metal cations, examples being 1,2-dicarboxylic acids such as, for example, maleic acid, fumaric acid, itaconic acid, or monomers having complexing groups such as 2-(methacryloyloxy)ethyl acetoacetate, for example.

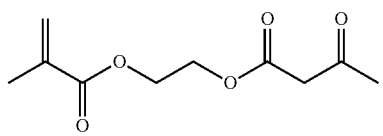

C1 to C20 alkyl(meth)acrylates are, for example, methyl acrylate and methyl methacrylate. Monomers comprising hydroxyl groups are, for example, $C_1$-$C_{10}$ hydroxyalkyl (meth)acrylates. Vinyl esters of carboxylic acids having 1 to 20 carbon atoms are, for example, vinyl acetate, vinyl laurate, vinyl stearate, vinyl propionate, and vinyl esters of Versatic acid. Vinylaromatic compounds contemplated include vinyltoluene, alpha- and p-methyl styrene, alpha-butyl styrene, 4-n-butyl styrene, 4-n-decyl styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether or vinyl isobutyl ether. Preferred vinyl ethers are those of alcohols comprising 1 to 4 carbon atoms. Suitable hydrocarbons having 4 to 8 carbon atoms and two olefinic double bonds are, for example, butadiene, isoprene, and chloroprene.

Preferred as further monomers (iv) are methyl acrylate, methyl methacrylate, vinyl esters, especially vinyl acetate, and mixtures thereof, and also C2 to C10 hydroxyalkyl (meth)acrylates. Especially preferred are methyl acrylate, methyl methacrylate, vinyl acetate, and hydroxypropyl acrylate, and also mixtures of these monomers.

In the polymerization it is possible to use chain transfer agents (CTAs). Preferably no CTAs are used. If CTAs are used, the amounts involved are preferably at least 0.01 part by weight of CTA per 100 parts by weight of monomers, e.g., from 0.01 to 5 parts by weight, or from 0.01 to 3 parts by weight per 100 parts by weight of the monomers to be polymerized. By this means it is possible to control or reduce the molar mass of the emulsion polymer, through a chain termination reaction. The CTAs here are bonded onto the polymer, generally onto the chain end. They may be added continuously or in stages during the polymerization.

Suitable CTAs are, for example, organic compounds which comprise sulfur in bound form (e.g., compounds having a thiol group), aliphatic and/or araliphatic halogen compounds, aliphatic and/or aromatic aldehydes, unsaturated fatty acids (such as oleic acid), dienes having nonconjugated double bonds (such as divinylmethane, terpinolene or vinylcyclohexene), hydrocarbons having readily abstractable hydrogen atoms (such as toluene), organic acids and/or their salts (such as formic acid, sodium formate, ammonium formate), alcohols (such as isopropanol), and phosphorus compounds (such as sodium hypophosphite). It is, however, also possible to use mixtures of aforesaid CTAs that do not disrupt one another. Generally speaking, the CTAs are low molecular weight compounds, having a molar weight of less than 2000, more particularly less than 1000 g/mol. It is useful if a portion or the entirety of the CTAs is fed to the aqueous reaction medium before the radical polymerization is initiated. Furthermore, a portion or the entirety of the radical chain transfer compound can also be fed advantageously to the aqueous reaction medium together with the monomers during the polymerization.

Organic compounds having a thiol group are, for example, primary, secondary or tertiary aliphatic thiols, such as, for example, ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as 2-hydroxyethanethiol, for example, aromatic thiols, such as benzenethiol, ortho-, meta-, or para-methylbenzenethiol, mercaptoalkylcarboxylic esters of, for example, from C2 to C4 carboxylic acids having 1 to 18 carbon atoms in the alkyl group, e.g., 2-mercaptoethyl propionate, and also other sulfur compounds described in the Polymer Handbook, 3rd edition, 1989, J. Brandrup and E. H. Immergut, John Wiley & Sons, section II, pages 133 to 141. Preferred organic compounds comprising sulfur in bound form are, in particular, tert-butyl mercaptan, ethyl thioglycolate, mercaptoethanol, mercaptopropyltrimethoxysilane, tert-dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid, and thiourea. Particularly preferred thio compounds are tert-butyl mercaptan, ethyl thioglycolate, mercaptoethanol, mercaptopropyltrimethoxysilane or tert-dodecyl mercaptan.

Aliphatic and/or araliphatic halogen compounds are, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide. Aliphatic and/or aromatic aldehydes are, for example, formaldehyde, acetaldeyhde, propionaldehyde and/or benzaldehyde.

It has been found that the adhesive properties can be positively influenced through the nature and amount of the gel content. The total gel content of the PSA composition is at least 40 wt %, preferably at least 50 wt %, at least 60 wt % or at least 70 wt %, based on the solids content of the composition.

The gel content is composed of a gel content which is based on covalent, irreversible crosslinking of the polymer chains (covalent bonds between polymer chains) and a gel content which is based on reversible crosslinking of the polymer chains by metal salts. This reversible crosslinking takes place not via covalent bonds but instead, for example, via ionic bonds or formation of complexes with at least divalent metal cations.

The gel content that is based on reversible crosslinking via metal salts is at least 10 wt %, preferably at least 20 wt %, at least 25 wt % or at least 30 wt % or at least 40 wt %, based on the solids content. The gel content that is based on reversible crosslinking via metal salts may be adjusted through the nature and amount of the metal cations or metal compounds used.

The gel content that is based on covalent, irreversible crosslinking of the polymers may be 0 to 50 wt %, preferably not more than 40 wt % or not more than 30 wt %, e.g., greater than zero to 40 wt % or 1 to 30 wt %, based on the solids content. The gel content that is based on covalent, irreversible crosslinking of the polymers may be adjusted by using small amounts of CTAs and/or by using styrene as comonomer. Preferably no CTA is used and the amount of styrene in that case is at least 5 parts by weight, based on the sum of all the monomers.

The metal salt crosslinking may take place by addition of suitable metal salts after the polymerization. The metal salts are preferably used in a molar ratio of metal cation, relative to carboxylate groups of the polymer, of 1 to 300 mol %, preferably of 1 to 100 mol %, more preferably 1 to 50 mol %.

Suitable metal salts are, for example, those with the metal cations $Al^{3+}$, $Zn^{2+}$, $Ti^{4+}$, $Fe^{2+}$, $Fe^{3+}$ and $Zr^{4+}$. Examples of suitable counterions are acetylacetonates, hydroxides, oxalates, lactate, glycinate, acetate, and also carboxylate groups, or acrylate oligomers which contain 2-(methacryloyloxy)ethyl acetoacetate groups and have a molar mass of up to 50 000 g/mol. Suitable metal salts are, for example, aluminum acetylacetonate $Al(acac)_3$, titanium diisopropoxide bis(acetylacetonate) $Ti(acac)_2OiPr_2$, diammonium bis [carbonato-O]-dihydroxyzirconate (Bacote® 20), iron(II) oxalate, calcium hydroxide or zinc hydroxide, e.g., $Zn(OH)_2/NH_3$. More preferably the metal salt is selected from the zinc salts and aluminum salts, preferably the acetylacetonates, more particularly $Al(acac)_3$.

Preferred metal salts have a water solubility of less than 10 g/l (at 25° C.).

The metal salt crosslinking may also take place by direct incorporation of metal salts during the emulsion polymerization, through copolymerization of suitable organometallic comonomers. The amount of such organometallic comonomers is preferably 0.1 to 3 wt %, more preferably from 0.1 to 2.5 wt %, based on the sum of all the monomers.

Suitable organometallic comonomers are, for example, aluminum acrylate $Al(AA)_3$, aluminum methacrylate $Al(MAA)_3$, zinc acrylate $Zn(AA)_2$, zinc methacrylate $Zn(MAA)_2$, titanium(IV) acrylate and titanium(IV) methacrylate. Particularly preferred are zinc (meth)acrylate and aluminum (meth)acrylate, especially zinc methacrylate.

The metal salts which bring about the reversible crosslinking are used in uncoated form, so that the reversible metal salt crosslinking can take place in the aqueous polymer dispersion itself and is not prevented by a coating of the metal salts in the form, for example, of a wax layer. It has been found that the PSA compositions of the invention are storage-stable, i.e., do not coagulate or develop increased viscosity over time. "Storage-stable" means in particular that the viscosity on storage in a period of 5 days at 20° C. the viscosity change is less than 100%, based on the initial viscosity. The proportion of coagulum formation (removable by filtration with a 250 μm mesh-size filter) preferably does not exceed 5 wt %, based on the solids content of the dispersion.

One particularly preferred pressure-sensitive adhesive composition in the form of an aqueous polymer dispersion comprises at least one pressure-sensitive adhesive polymer which is is formed from (i) at least 65 wt %, based on the sum of the monomers, of at least one acrylic ester monomer selected from n-butyl acrylate and 2-ethylhexyl acrylate,
(ii) 0.5 to 8 wt %, based on the sum of the monomers, of methacrylic acid,
(iii) 0 to 30 wt %, based on the sum of the monomers, of styrene,
(iv) 0 to 10 wt %, based on the sum of the monomers, of monomers selected from the group consisting of C1 to C20 alkyl (meth)acrylates, monomers comprising hydroxyl groups, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, which are different from the monomers (i) to (iii)
where the pressure-sensitive adhesive polymer has a total gel content of at least 50 wt %, based on the solids content,
where the gel content of the pressure-sensitive adhesive polymer that is based on reversible crosslinking by metal salts is at least 40 wt %,
where the gel content of the pressure-sensitive adhesive polymer that is based on covalent, irreversible crosslinking is greater than 0 and up to 30 wt %, where the metal cations of the metal salts are selected from $Al^{3+}$, $Zn^{2+}$, $Ti^{4+}$, $Ca^{2+}$, $Fe^{3+}$ and $Zr^{4+}$, and
where the glass transition temperature of the polymer is less than −20° C.

The adhesive polymers of the invention are obtainable by radical polymerization of ethylenically unsaturated compounds (monomers). The polymers are prepared preferably by emulsion polymerization, and are therefore preferably emulsion polymers.

Accordingly, another subject of the invention are pressure-sensitive adhesive dispersions comprising a pressure-sensitive adhesive polymer of the invention in dispersion in water, said polymer having been prepared by emulsion polymerization.

In the emulsion polymerization, ethylenically unsaturated compounds (monomers) are polymerized in water, using ionic and/or nonionic emulsifiers and/or protective colloids, or stabilizers, as interface-active compounds for stabilizing the monomer droplets and the polymer particles formed subsequently from the monomers. The interface-active substances are used customarily in amounts of 0.1 to 10 parts by weight, preferably 0.2 to 5 parts by weight, based on 100 parts by weight of the monomers to be polymerized.

A comprehensive description of suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pp. 411 to 420. Emulsifiers contemplated include anionic, cationic, and nonionic emulsifiers. Interface-active substances used are preferably emulsifiers, whose molecular weights, in contrast to those of the protective colloids, are customarily below 2000 g/mol. Where mixtures of interface-active substances are used, the individual components must of course be compatible with one another, something which in case of doubt can be checked using a few preliminary tests. Interface-active substances used are preferably anionic and nonionic emulsifiers. Common accompanying emulsifiers are, for example, ethoxylated fatty alcohols (EO degree: 3 to 50, alkyl radical: C8 to C36), ethoxylated mono-, di-, and trialkylphenols (EO degree: 3 to 50, alkyl radical: C4 to $C_9$), alkali metal salts of dialkyl esters of sulfosuccinic acid, and also alkali metal salts and ammonium salts of alkyl sulfates (alkyl radical: $C_8$ to $C_{12}$), of ethoxylated alkanols (EO degree: 4 to 30, alkyl radical: C12 to C18), of ethoxylated alkylphenols (EO degree: 3 to 50, alkyl radical: C4 to C9), of alkylsulfonic acids (alkyl radical: C12 to C18), and of alkylarylsulfonic acids (alkyl radical: C9 to 018).

Further suitable emulsifiers are compounds of the general formula

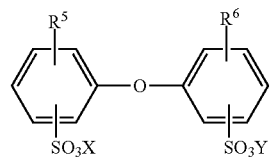

in which R5 and R6 are hydrogen or C4 to C14 alkyl and not simultaneously hydrogen, and X and Y may be alkali metal ions and/or ammonium ions. Preferably, R5 and R6 are linear or branched alkyl radicals having 6 to 18 carbon atoms or hydrogen, and in particular having 6, 12, and 16 carbon atoms, with R5 and R6 not both simultaneously being hydrogen. X and Y are preferably sodium, potassium, or ammonium ions, with sodium being particularly preferred. Particularly advantageous compounds are those in which X and Y are sodium, R5 is a branched alkyl radical having 12 carbon atoms, and R6 is hydrogen or R5. Use is frequently made of technical mixtures having a fraction of 50 to 90 wt % of the monoalkylated product. Commercial products of suitable emulsifiers are, for example, Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. For the present invention, ionic emulsifiers or protective colloids are preferred. With particular preference they are ionic emulsifiers, more particularly salts and acids, such as carboxylic acids, sulfonic acids, and sulfates, sulfonates or carboxylates. In particular, use may also be made of mixtures of ionic and nonionic emulsifiers.

The emulsion polymerization may be started using water-soluble initiators. Water-soluble initiators are, for example, ammonium salts and alkali metal salts of peroxo-disulfuric acid, sodium peroxodisulfate for example, hydrogen peroxide, or organic peroxides, tert-butyl hydroperoxide for example. Other suitable initiators include those called reduction-oxidation (redox) initiator systems. The redox initiator systems consist of at least one, usually inorganic, reducing agent and an organic or inorganic oxidizing agent. The oxidizing component comprises, for example, the initiators already stated above for the emulsion polymerization. The reducing components comprise, for example, alkali metal salts of sulfurous acid, such as sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems may be used along with soluble metal compounds whose metallic component is able to exist in a plurality of valence states. Examples of customary redox initiator systems include ascorbic acid/iron (II) sulfate/sodium peroxydisulfate, tert-butyl hydroperoxide/sodium disulfite, tert-butyl hydroperoxide/Na hydroxymethanesulfinic acid. The individual components, the reducing component for example, may also be mixtures, an example being a mixture of the sodium salt of hydroxymethanesulfinic acid and sodium disulfite.

The stated initiators are used usually in the form of aqueous solutions, with the lower concentration being determined by the amount of water that is acceptable in the dispersion, and the upper concentration by the solubility of the respective compound in water. Generally speaking, the concentration of the initiators is 0.1 to 30 wt %, preferably 0.5 to 20 wt %, more preferably 1.0 to 10 wt %, based on the monomers to be polymerized. It is also possible for a plurality of different initiators to be used in the emulsion polymerization.

The emulsion polymerization takes place in general at 30 to 130° C., preferably at 50 to 95° C. The polymerization medium may consist either of water alone or else of mixtures of water and liquids miscible therewith such as methanol. Preference is given to using water alone. The emulsion polymerization may be carried out either as a batch operation or in the form of a feed process, including staged or gradient regimes. The feed process is preferred, in which a portion of the polymerization batch is introduced as an initial charge, and is heated to the polymerization temperature and its polymerization commenced, and then the remainder of the polymerization batch is supplied to the polymerization zone, customarily via a plurality of spatially separate feeds, of which one or more comprise the monomers in pure form or in emulsified form, this supply taking place continuously, in stages, or subject to a concentration gradient, with the polymerization being maintained. In the polymerization it is also possible for a polymer seed to be included in the initial charge, for the purpose of more effective setting of the particle size, for example.

The manner in which the initiator is added to the polymerization vessel in the course of the radical aqueous emulsion polymerization is known to a person of ordinary skill in the art. It may either be included in its entirety in the initial charge to the polymerization vessel, or introduced continuously or in stages at the rate at which it is consumed in the course of the radical aqueous emulsion polymerization. Individually, this is dependent on the chemical nature of the initiator system and also on the polymerization temperature. Preference is given to including part in the initial charge and supplying the remainder to the polymerization zone at the rate at which it is consumed. In order to remove the residual monomers, it is customary to add initiator after the end of the actual emulsion polymerization as well, i.e., after a monomer conversion of at least 95%. In the case of the feed process, the individual components may be added to the reactor from above, at the side, or from below, through the reactor bottom.

In the emulsion polymerization, aqueous dispersions of the polymer with solids contents generally of 15 to 75 wt %, preferably of 40 to 75 wt %, are obtained. For a high space/time yield of the reactor, dispersions with as high as possible a solids content are preferred. In order to be able to achieve solids contents >60 wt %, a bimodal or polymodal particle size ought to be established, since otherwise the viscosity becomes too high and the dispersion can no longer be managed. Producing a new generation of particles can be accomplished, for example, by adding seed (EP 81083), by adding excess amounts of emulsifier, or by adding miniemulsions. Another advantage associated with the combination of low viscosity and high solids content is the improved coating characteristics at high solids contents. Producing one or more new generations of particles is something which can be done at any point in time. This time is guided by the particle size distribution that is desired for a low viscosity.

The polymer thus prepared is used preferably in the form of its aqueous dispersion. The size distribution of the dispersion particles may be monomodal, bimodal or multimodal. By average particle size here is meant the $d_{50}$ of the particle size distribution, meaning that 50 wt % of the total mass of all particles have a particle diameter smaller than the $d_{50}$. The particle size distribution can be determined in a known way using an analytical ultracentrifuge (W. Mächtle, Makromolekulare Chemie 185 (1984), pp. 1025-1039). In the case of bimodal or multimodal particle size distribution, the particle size may be up to 1000 nm. The pH of the polymer dispersion is set preferably at a pH greater than 4.5, more particularly at a pH of between 5 and 8.

A PSA composition of the invention comprises the PSA polymers preferably in the form of the aqueous polymer dispersion as obtained or obtainable by the emulsion polymerization. The PSA compositions may consist solely of the polymers or of the aqueous dispersion of the polymers. Additionally, however, the PSA may comprise further adjuvants as well, examples being fillers, dyes, flow control agents, thickeners, preferably associative thickeners, defoamers, crosslinkers, plasticizers, pigments or wetting agents. For more effective wetting of surfaces, the PSAs may comprise, in particular, wetting assistants (wetting agents), examples being fatty alcohol ethoxylates, alkylphenol ethoxylates, nonylphenol ethoxylates, polyoxyethylene/propylenes, or sodium dodecylsulfonates. The amount of adjuvants is generally 0.05 to 5 parts by weight, more particularly 0.1 to 3 parts by weight, per 100 parts by weight of polymer (solid).

The PSA composition preferably comprises at least one tackifier (tackifying resins) in an amount of preferably 5 to 40 parts by weight, based on 100 parts by weight of adhesive polymer. A tackifier is a polymeric or oligomeric adjuvant for adhesive polymers or, generally, for elastomers, which increases their autoadhesion (tack, inherent stickiness, self-adhesion), meaning that they adhere firmly to surfaces after brief, gentle applied pressure. Tackifiers are, for example, natural resins, such as rosins, and their derivatives formed by disproportionation or isomerization, polymerization, dimerization and/or hydrogenation, or terpene resins. They may be present in their salt form (with, for example, monovalent or polyvalent counterions (cations)) or, preferably, in their esterified form. Alcohols used for the esterification may be monohydric or polyhydric. Examples are methanol, ethanediol, diethylene glycol, triethylene glycol, 1,2,3-propanethiol, and pentaerythritol. Also used, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, alpha-methylstyrene, and vinyltoluene. Tackifiers are known, for example, from Adhesive Age, July 1987, pages 19-23 or Polym. Mater. Sci. Eng. 61 (1989), pages 588-592.

Also being used increasingly as tackifiers are polyacrylates which have a low molar weight. These polyacrylates preferably have a weight-average molecular weight $M_w$ below 50 000, more particularly below 30 000. The polyacrylates consist preferably to an extent of at least 60 wt %, more particularly at least 80 wt %, of $C_1$-$C_8$ alkyl (meth)acrylates. Suitability is possessed, for example, by the low molecular weight polymers and oligomers described in WO 2013/117428, having a weight-average molecular weight of less than 50 000 and a glass transition temperature of greater than or equal to −40° C. to less than or equal to 0° C., preferably of greater than or equal to −35° C. to less than or equal to 0° C., preparable by emulsion polymerization in the presence of at least one chain transfer agent and preparable from a monomer mixture comprising at least 40 wt % of at least one C1 to C20 alkyl (meth)acrylate. Preferred tackifiers are natural or chemically modified rosins. Rosins consist predominantly of abietic acid or derivatives of abietic acid. The tackifiers can be added simply to the polymer dispersion. In this case the tackifiers themselves are preferably in the form of an aqueous dispersion. The amount by weight of the tackifiers is preferably 5 to 100 parts by weight, more preferably 10 to 50 parts by weight, based on 100 parts by weight of polymer (solid/solid).

The PSA composition preferably comprises
60-95 parts by weight PSA polymer,
5-40 parts by weight of tackifier(s) and
optionally 0-10 parts by weight of further constituents such as, for example, the aforementioned wetting agents, thickeners, defoamers, crosslinkers, etc.

The one-component PSA composition can be used for producing self-adhesive articles. The articles are at least partly coated with the PSA. The adhesive properties can be adjusted so that the self-adhesive articles are removable again after bonding. The self-adhesive articles may be, for example, adhesive labels, adhesive tapes or adhesive foils. Suitable carrier materials are, for example, paper, polymeric foils, and metal foils. In the case of self-adhesive tapes of the invention, the tapes may be single-sidedly or double-sidedly coated tapes comprising the above substances. Self-adhesive labels of the invention may be labels composed of paper or of a thermoplastic foil. Particularly preferred are adhesive tapes composed of thermoplastic foil. Thermoplastic foil contemplated includes, for example, foils of polyolefins (e.g., polyethylene, polypropylene), polyolefin copolymers, foils of polyesters (e.g., polyethylene terephthalate), polyvinyl chloride or polyacetate. The surfaces of the thermoplastic polymer foils are preferably corona-treated. The labels are single-sidedly coated with adhesive. Preferred substrates for the self-adhesive articles are paper and polymer foils.

The self-adhesive articles have an at least partial coating on at least one surface with a PSA of the invention. The adhesive may be applied to the articles by customary techniques such as rolling, knifecoating or spreading. The coatweight is preferably 0.1 to 300 g, more preferably 2 to 150 g, of solids per m². Following application, there is generally a drying step for removing the water and/or the solvents. The water may be removed by drying at 50 to 150° C., or example. The coated substrates obtained in this way are used, for example, as self-adhesive articles, such as adhesive labels, adhesive tapes or adhesive foils. The carriers for this purpose may be cut to form adhesive tapes, labels or foils, before or after the adhesive is applied. For later use, the PSA-coated side of the substrates may be lined with a release paper, such as with siliconized paper, for example.

The substrates to which the self-adhesive articles may advantageously be applied may comprise, for example, metal, wood, glass, paper or plastic. The self-adhesive articles are especially suitable for bonding on packaging surfaces, cartons, plastic packaging, books, windows, vapor barriers, motor vehicle bodies, tires or bodywork parts.

The invention also relates to the use of the above-described one-component PSA composition for producing adhesive labels, adhesive tapes or adhesive foils.

The invention also relates to self-adhesive articles coated with an above-described one-component PSA composition.

The invention also relates to a method for producing a self-adhesive article by coating a substrate with an above-described one-component PSA composition.

EXAMPLES

Starting materials and abbreviations used are as follows:
EHA: 2-Ethylhexyl acrylate
BA: n-Butyl acrylate
EA: Ethyl acrylate
MA Methyl acrylate
MMA Methyl methacrylate
VAc: Vinyl acetate
S: Styrene
HPA Hydroxypropyl acrylate
AA: Acrylic acid
MAA Methacrylic acid
BDA-2 Butanediol diacrylate (crosslinker for covalent, irreversible crosslinking)
tDMC tert-Dodecyl mercaptan
EHTG 2-ethylhexyl thioglycolate
Al(acac)$_3$ Aluminum acetylacetonate
Rongalit® Sodium hydroxymethylsulfinate
Acronal® 310 S Acrylate copolymer of (meth)acrylic esters and acrylic acid with a gel content of 67.5%
Acronal® 4D Acrylate copolymer of (meth)acrylic esters and acrylic acid with a gel content of 65%
Acronal® 50D Acrylate copolymer of (meth)acrylic esters, acrylonitrile and acrylic acid having a gel content of 79%
Room temperature refers to 20° C. unless otherwise indicated.

The examples denoted by C . . . are comparative examples; the examples denoted by I . . . are inventive examples.

Performance Tests
Determination of Total Gel Content
Polymer films are produced from the polymer dispersion under investigation. The polymer films are dried for 1 day at room temperature (20° C.) and then for 4 days at 50° C. The dried film is admixed with 99 times the mass of methyl ethyl ketone. The inserted film is stored at room temperature for 4 days. Then the swollen or dissolved film is filtered off over tared 125 µm Perlon filters. The filter is dried at room temperature until it is free of solvent. This is followed by further drying at 50° C. for an hour, and the gel fraction (solids fraction insoluble in methyl ethyl ketone and remaining in the filter) is determined by reweighing.

The total gel content ($gel_{total}$) is 1 determined after the addition of metal crosslinker. The gel content based on covalent, irreversible crosslinking ($gel_{irreversible}$) is determined before the addition of metal crosslinker. The gel content based on reversible crosslinking via metal salts ($gel_{reversible}$) is the difference between total gel content and irreversible gel content:

$$gel_{reversible} = gel_{total} - gel_{irreversible}$$

Testing of Adhesive Properties
To test the adhesive properties, the PSAs are coated with a coatweight of around 60 g/m² onto Hostaphan® RN 36 (biaxially oriented polyethylene terephthalate film, 36 µm in thickness) as carrier and dried at 90° C. for 3 minutes. Dispersion films with metal salt crosslinked are stored for 5 days under standard conditions (23° C., 50% relative humidity); dispersion films without metal salt added are stored under standard conditions of temperature and humidity for 24 hours and then the adhesive properties are determined under standard conditions of temperature and humidity, unless otherwise indicated.

Quickstick

In the determination of the quickstick (surface tack, also called loop tack), generally, a determination is made of the force with which an adhesive applied to a carrier material by bonding without pressure onto a substrate opposes removal from the substrate at a defined removal speed. Test substrates are steel or polyethylene. From the carrier coated with adhesive, a test strip 25 mm in width and 250 mm in length is cut and is stored under standard conditions of temperature and humidity (23° C., 50% relative humidity) for at least 16 hours. The two ends of the test strip are folded over for a length of around 1 cm with the adhesive side inward. A loop is formed from the adhesive strip, with the adhesive side outward, and the two ends are brought together and clamped into the upper jaw of a tensile testing machine. The test substrate mount is clamped into the lower jaw. The loop of adhesive strip is run downward through the tensile testing machine at a speed of 300 mm/minute, causing the adhesive side of the test strip to bond to the substrate without additional pressure. The tensile testing machine is halted and is immediately moved upward again when the bottom edge of the upper jaw is 40 mm above the substrate. The test result is reported in N/25 mm width. The maximum value on the display (Fmax) is read off as the measure of the surface tack. An average is formed from three individual results.

Peel Strength

For the determination of the peel strength (adhesion), a test strip 25 mm wide is adhered in each case to a test element composed of polyethylene or steel, and is rolled down once with a roller weighing 1 kg. The strip was then clamped by one end into the upper jaws of a tensile strain testing apparatus. The adhesive strip was peeled from the test surface at an angle of 180° and at 300 mm/min—that is, the adhesive strip was bent around and pulled off parallel to the test element, and the expenditure of force required to achieve this was measured. The measure of the peel strength was the force in N/25 mm which resulted as the average value from five measurements. The peel strength was determined 24 hours after bonding. After this time, the bonding force has fully developed. The test methods correspond essentially to Finat test methods (FTM) 1 and 8.

Shear Strength

The shear strength is a measure of the cohesion. The PSA-coated carrier is cut into test strips 25 mm and 12.5 mm wide, respectively. For determination of the shear strength, the test strips are adhered to steel, with a bonded area 25×25 mm (measurements at 70° C.) or 12.5×12.5 mm (measurements under standard conditions of temperature and humidity) and rolled down once with a roller weighing 1 kg, and, after storage for 10 minutes (under standard conditions of temperature and humidity, 50% relative humidity, 1 bar, 23° C.) they are loaded in suspension with a 1 kg weight (under standard conditions of temperature and humidity, 12.5×12.5 mm) or with a 2 kg weight (at 70° C., 25×25 mm). The measure of the shear strength is the time taken, in minutes, for the weight drop; the average is calculated in each case from five measurements.

The shear strength 3 d/70° C. [h] is the shear strength after storage of the test strips at 70° C. for 3 days.

S.A.F.T. Test (Heat Stability)

The test strips are adhered to AFERA steel, with a bonded area of 25×25 mm, rolled down four times using a roller weighing 2 kg, and, after a contact time of at least 16 hours, loaded in suspension with a 1 kg weight. During loading, heating takes place continuously, starting from 23° C., at a rate of 0.5° C./min. The heating temperature achieved when the weight drops off is a measure of the heat stability of the adhesive.

The average was calculated in each case from three measurements.

Test Protocol: Plasticizer Resistance, Cross-Cut

Plasticizer resistance is the capacity of an adhesive to counter any possible migration of plasticizer particles from a plasticized PVC foil into the adhesive. The loss in volume resulting from the migration of plasticizer causes the plasticized PVC film to shrink. The adhesive under test is drawn down with a coatweight of around 22 g/m$^2$ (dry), using a laboratory coating table, onto an auxiliary carrier material (NSA 1370 white silicone paper from Laufenberg) and dried in a forced-air drying cabinet at 90° C. for 3 minutes. After the drying process, the adhesive is transferred from the auxiliary carrier material onto the final carrier material (H935693 monomer-plasticized PVC foil, white, from Renolit) and then again lined with silicone paper. After 5 days of storage under standard conditions of temperature and humidity (23° C., 50% relative humidity), the silicone paper is removed and the coated carrier material is adhered without bubbles to a glass plate (250 mm×250 mm×4 mm) and rolled down. Here, the running direction of the foil should be noted and marked. The foil edges protruding from the glass plate are cut off flush using a carton knife. The bonded foil is then divided with one cut each, using a razor blade 0.043 mm thick, in the middle in the longitudinal direction (running direction of the foil, machine direction) and in the cross direction (transverse to the machine direction), thus forming four squares of equal size. The bonded glass plate is subsequently stored at 70° C. for 5 days. Following storage, the glass plate is taken from the drying cabinet and cooled at room temperature for about 1 hour. Using a magnifier with 10-times magnification and a scaling of 10 sd/mm, a measurement is made of the width of the horizontal and vertical cut gap at at least two different locations in each case. The test results reported are the average values of the individual values for each direction in mm.

Test Protocol: Laminate Shrinkage

A laminate sheet (25×25 cm) is prepared and is conditioned under standard conditions of temperature and humidity (23° C., 50% relative humidity) for 5 days. The laminate sheet consists of an auxiliary silicone paper carrier, the layer of adhesive, and the carrier material (monomer-plasticized PVC foil, Renolit). The adhesive coatweight is around 22 g/m$^2$ (dry).

After hot storage (3 days at 70° C.), a magnifier is used to measure the shrinkage in length (=machine direction) and width (=cross direction), and the result is reported in %.

Test Procedure, Blushing Stability

Coating of an OPP foil (biaxially oriented polypropylene, foil thickness 45 μm) with a target coatweight (dry) of around 20 g/m$^2$.

Drying of the film at 90° C. for 3 min.

Lining of the coating with silicone paper, storage of the coating for 24 h.

Taking of a sample approximately 8 mm wide and 30 mm long.

Transfer of the sample to a PS cell filled with fully demineralized water, cell path length 1 cm. Immediate measurement of the absorption relative to uncoated comparison sample, OPP foil in fully demineralized water, in the 300-700 nm wavelength range. This is followed by further measurements every 5 minutes over a period of 6 hours. Conversion of the absorption into haze.

Examples C1 to C4 and I1 to I4b—One-Component Adhesives

Comparative samples C1 to C3: only covalent, irreversible crosslinking Inventive samples I1 to I4b: covalent crosslinking less than 50%, with subsequent metal salt crosslinking Emulsion polymers are used that are prepared from the monomers identified in Table 1 and are admixed with Snowtack® 933 tackifier (rosin ester dispersion) in a weight ratio of 75:25 (solid:solid, polymer to tackifier). The quantities are parts by weight. The examples designated by C . . . are comparative examples; the examples designated by I . . . are inventive examples.

TABLE 1a

Emulsion polymers

| Example | EHA | BA | S | MA | MAA | BDA-2 | Al(acac)$_3$ [pphm] | tDMC |
|---|---|---|---|---|---|---|---|---|
| C1 | 59 | 15 | 20 | 5 | 1 | 0.07 | — | — |
| I1 | 59 | 15 | 20 | 5 | 1 | — | 0.25 | — |
| C2 | 59 | 15 | 20 | 5 | 1 | 0.1 | — | — |
| I2 | 59 | 15 | 20 | 5 | 1 | — | 0.375 | — |
| C3 | 59 | 15 | 20 | 5 | 1 | 0.25 | — | — |
| I3 | 59 | 15 | 20 | 5 | 1 | — | 1 | — |
| C4[1)] | 97.5 | — | — | — | 2.5 | — | — | — |
| I4a[2)] | 97.5 | — | — | — | 2.5 | — | 0.5 | 0.15 |
| I4b[2)] | 97.5 | — | — | — | 2.5 | — | 1 | 0.15 |

[1)]Initiator: sodium persulfate
[2)]Redox initiator: tert-butyl hydroperoxide/Rongalit®

TABLE 1b

Gel contents and glass transition temperature

| Example | Gel$_{irreversible}$ [%] | Gel$_{total}$ [%] | Tg [° C.] |
|---|---|---|---|
| C1 | 55.9 | 55.9 | about −30 |
| I1 | <5 | 45.1 | about −30 |
| C2 | 68.8 | 68.8 | about −30 |
| I2 | <5 | 67.2 | about −30 |
| C3 | 85.6 | 85.6 | about −30 |
| I3 | <5 | 87.7 | about −30 |
| C4 | 75 | 75 | about −55 |
| I4a | 29 | nd | about −55 |
| I4b | 29 | 62.5 | about −55 |

Adhesive foils were produced and the adhesive values were measured (quickstick, peel strength, shear strength, heat stability S.A.F.T. test). The results are set out in Table 1c.

TABLE 1c

Performance results

| | Quickstick [N/25 mm] | | Peel strength [N/25 mm] | | Shear strength [h] | | S.A.F.T. |
|---|---|---|---|---|---|---|---|
| Example | Steel | PE | Steel | PE | SC | 70° C. | [° C.] |
| C1 | 14.9 | 12.6 | 15.6 | 7.3 | 0.9 | 0.07 | 68 |
| I1 | 15.0 | 14.9 | 15.1 | 7.3 | 1.4 | 0.1 | 81 |
| C2 | 15.5 | 12.8 | 14.2 | 7.1 | 0.8 | 0.1 | 71 |
| I2 | 16.2 | 13.5 | 14.9 | 8.0 | 1.4 | 0.2 | 92 |
| C3 | 11.3 | 9.2 | 10.6 | 5.3 | 0.8 | 0.1 | 93 |
| I3 | 13.7 | 11.7 | 14.5 | 6.7 | 0.8 | 1.2 | 162 |
| C4 | 10.0 | 6.6 | 9.2 | 2.6 | 0.03 | 0.03 | 46 |
| I4a | 15.7 | 15.0 | 14.7 | 11.3 | 0.1 | 0.05 | 51 |
| I4b | 13.8 | 8.7 | 13.3 | 4.1 | 0.2 | 0.05 | 65 |

The examples show that for comparable total gel contents, the samples with metal salt crosslinking achieve better adhesion and cohesion values and/or heat stabilities (SAFT).

Examples C5 to C6 and I5 to I6—One-Component Adhesives

Comparative samples C5 to C6: only covalent, irreversible crosslinking Inventive samples I1 to I5: covalent crosslinking less than 50%, with subsequent metal salt crosslinking Emulsion polymers are used that are prepared from the monomers identified in Table 2a. Examples C5 and I5 are without tackifier. Examples C6 and I6 are admixed with Snowtack® 933 tackifier in a weight ratio of 75:25 (solid:solid, polymer to tackifier). The quantities are parts by weight.

TABLE 2a

Emulsion polymers

| Example | BA | S | MAA | Al(acac)$_3$ [pphm] | Gel$_{irreversible}$ [%] | Gel$_{total}$ [%] | Tg [° C.] |
|---|---|---|---|---|---|---|---|
| C5 | 75 | 20 | 5 | — | 20.6 | 20.6 | −17 |
| I5 | 75 | 20 | 5 | 1 | 20.6 | 91.8 | −17 |
| C6 | 75 | 20 | 5 | — | 20.6 | 20.6 | −17 |
| I6 | 75 | 20 | 5 | 1 | 20.6 | 91.8 | −17 |

Adhesive foils were produced and the adhesive values were measured (quickstick, peel strength, shear strength, heat stability S.A.F.T. test). The results are set out in Table 2b.

TABLE 2b

Performance results

| | Quickstick [N/25 mm] | | Peel strength [N/25 mm] | | Shear strength [h] | | S.A.F.T. |
|---|---|---|---|---|---|---|---|
| Example | Steel | PE | Steel | PE | SC | 70° C. | [° C.] |
| C5 | 11.4 | | 10.9 | 2.7 | 85.3 | 20.0 | 128 |
| I5 | 10.6 | | 8.6 | 2.0 | 191.0 | >141 | >180 |
| C6 | 2.1 | | 16.8 | 10.0 | 10.4 | 0.5 | 109 |
| I6 | 3.0 | | 17.6 | 10.0 | 24.5 | 8.3 | 142 |

The examples show, when using a metal salt crosslinking, a sharp increase in the cohesion and heat stability, with little or no drop in the adhesion.

Examples C7 to C8 and I7 to I8c—One-Component Adhesives

Emulsion polymers are used that are prepared from the monomers identified in Table 3a. Examples I7a, I8a-c, C7 and C8 are admixed with Snowtack® 933 tackifier in a weight ratio of 75:25 (solid: solid, polymer to tackifier). In Example I7b the weight ratio polymer:tackifier is 87.5:12.5. The quantities are parts by weight. In the case of Examples C7 and I7a-b, 0.26 pphm sodium persulfate was used. In Examples C8 and I8a-c, 0.52 pphm sodium persulfate was used.

TABLE 3a

Emulsion polymers with Tg around −38° C.

| Example | EHA | S | VAc | HPA | MAA | Al(acac)$_3$ [pphm] | Gel$_{irreversible}$ [%] | Gel$_{total}$ [%] |
|---|---|---|---|---|---|---|---|---|
| C7 | 77.5 | 10 | 8 | 2 | 2.5 | 0 | 17.3 | 17.3 |
| I7a | 77.5 | 10 | 8 | 2 | 2.5 | 1 | 17.3 | 82.4 |
| I7b | 77.5 | 10 | 8 | 2 | 2.5 | 1 | 17.3 | 82.4 |
| C8 | 77.5 | 10 | 8 | 2 | 2.5 | 0 | 21.6 | 21.6 |
| I8a | 77.5 | 10 | 8 | 2 | 2.5 | 1 | 21.6 | 86 |
| I8b | 77.5 | 10 | 8 | 2 | 2.5 | 1.5 | 21.6 | 90 |
| I8c | 77.5 | 10 | 8 | 2 | 2.5 | 2 | 21.6 | 91 |

TABLE 3b

Performance results

| | Quickstick [N/25 mm] | | Peel strength [N/25 mm] | | Shear strength [h] | | S.A.F.T. [° C.] |
|---|---|---|---|---|---|---|---|
| Example | Steel | PE | Steel | PE | SC | 70° C. | |
| C7 | 13.7 | 9.0 | 16.5 | 3.7 | 0.6 | 0.08 | 88 |
| I7a | 12.8 | 6.9 | 13.2 | 3.0 | 5.0 | 16.1 | >180 |
| I7b | 9.1 | 4.2 | 10.9 | 0.9 | 5.6 | >100 | >180 |
| C8 | 12.6 | 6.9 | 15.9 | 3.6 | 2.2 | 0.3 | 110 |
| I8a | 11.7 | 6.2 | 11.6 | 2.5 | 10.1 | 21.2 | >180 |
| I8b | 9.5 | 5.8 | 11.4 | 2.5 | 9.3 | 38.8 | >180 |
| I8c | 9.3 | 5.7 | 10.6 | 2.4 | 9.6 | 37.3 | >180 |

The examples show that by the addition of metal salt, the cohesion and the heat stability are increased very greatly, with no significant deterioration in the adhesion.

Examples I9 to I10b

One-Component Adhesives with Synthetic Tackifiers

Emulsion polymers are used that are prepared from the monomers stated in Table 4a, and are admixed with tackifiers A or B in a weight ratio of 75:25 (solid:solid, polymer to tackifier).

Tackifier polymer dispersion A: prepared from 65 parts by weight EHA/30 parts by weight MMA/5 parts by weight MAA and 5 parts by weight EHTG as CTA with Tg of −35° C.

Tackifier polymer dispersion B: prepared from 65 parts by weight EHA/30 parts by weight MMA/5 parts by weight MAA and 0.95 part by weight EHTG as CTA with Tg of −18.5° C.

TABLE 4a

Emulsion polymers without tackifier or with 25 parts by weight of tackifier to 75 parts by weight of adhesive polymer

| Example | EHA | BA | S | MA | VAc | HPA | MAA | Al(acac)$_3$ [pphm] | Tackifier |
|---|---|---|---|---|---|---|---|---|---|
| I9 | 59 | 25 | 10 | 3.5 | — | — | 2.5 | 1 | — |
| I9a | 59 | 25 | 10 | 3.5 | — | — | 2.5 | 1 | A |
| I9b | 59 | 25 | 10 | 3.5 | — | — | 2.5 | 1 | B |
| I10 | 77.5 | — | 10 | — | 8 | 2 | 2.5 | 1 | — |
| I10a | 77.5 | — | 10 | — | 8 | 2 | 2.5 | 1 | A |
| I10b | 77.5 | — | 10 | — | 8 | 2 | 2.5 | 1 | B |

TABLE 4b

Gel contents and glass transition temperature

| Example | Gel$_{irreversible}$ [%] | Gel$_{total}$ [%] | Tg [° C.] |
|---|---|---|---|
| I9 | 10 | 89 | −39 |
| I9a | 10 | 89 | −39 |
| I9b | 10 | 89 | −39 |
| I10 | 20 | 87 | −38 |
| I10a | 20 | 87 | −38 |
| I10b | 20 | 87 | −38 |

Adhesive foils were produced and the adhesive values were measured (quickstick, peel strength, shear strength, heat stability S.A.F.T. test). The results are set out in Table 4c.

TABLE 4c

Performance results

| | Quickstick [N/25 mm] | | Peel strength [N/25 mm] | | Shear strength [h] | | S.A.F.T. [° C.] |
|---|---|---|---|---|---|---|---|
| Example | Steel | PE | Steel | PE | SC | 70° C. | |
| I9 | 5.5 | 2.7 | 10.5 | 1.0 | 1.3 | >100 | >180 |
| I9a | 7.2 | 6.0 | 11.5 | 2.5 | 0.4 | 24.1 | 171 |
| I9b | 5.3 | 3.9 | 10.3 | 1.8 | 1.9 | 36.3 | 169 |
| I10 | 5.5 | 2.7 | 10.5 | 1.0 | 1.3 | >100 | >180 |
| I10a | 7.1 | 5.9 | 13.8 | 2.2 | 1.0 | 6.3 | >180 |
| I10b | 5.1 | 4.2 | 12.6 | 1.7 | 12.0 | 3.4 | 135 |

The examples show that by using tackifiers it is possible to boost the adhesion, especially to PE, without a sharp drop in the heat stability (SAFT).

Examples I11 and C11 One-Component Adhesives

Emulsion polymers are used that are prepared from the monomers stated in Table 5a, and are admixed with tackifiers A or B in a weight ratio of 75:25 (solid:solid, polymer to tackifier).

Tackifier: Tackifier polymer of 65 parts by weight EHA/30 parts by weight MMA/5 parts by weight MAA and 0.95 part by weight EHTG as CTA TABLE 5a Emulsion polymers with 25 parts by weight of tackifier to 75 parts by weight of adhesive polymer

| Example | EHA | S | VAc | MAA | HPA | BDA2 | Al(acac)$_3$ [pphm] | Gel$_{irreversible}$ [%] | Gel$_{total}$ [%] |
|---|---|---|---|---|---|---|---|---|---|
| I11 | 77.5 | 10 | 8 | 2.5 | 2 | — | 0.75 | 30 | 88 |
| C11 | 77 | 10 | 8 | 2.5 | 2 | 0.5 | — | 88 | 88 |

The results of the blushing stability test are set out in Table 5b.

TABLE 5b

| | Blushing stability | | | | |
|---|---|---|---|---|---|
| Example | 120 min | 180 min | 240 min | 300 min | 360 min |
| I11 | 0.7% | 0.7% | 0.8% | 0.9% | 1.3% |
| C11 | 1.00% | 1.5% | 2.0% | 2.4% | 3.0% |

The examples show that the sample crosslinked with metal salts, in comparison to a covalently irreversible cross-linked sample, with comparable total gel content, becomes cloudy less quickly during water storage—that is, exhibits better blushing resistance.

Examples I12a-c and C12

Polymer dispersions were prepared from the following monomers:

77.5 parts by weight EHA/10 parts by weight styrene/8 parts by weight VAc/2 parts by weight HPA/2.5 parts by weight MAA Comparative example C12 was prepared additionally with 0.07 part by weight BDA-2. In the case of Examples I12a-c, the ongoing polymerization, i.e., the time after the end of the monomer feed and initiator feed, at reaction temperature was carried out for different lengths of time. The samples were admixed with 0.75 pphm Al(acac)$_3$.

The polymer dispersions were blended with 25 parts by weight of Snowtack 933 to 75 parts by weight of adhesive polymer.

TABLE 6a

| | Gel contents | | | |
|---|---|---|---|---|
| Example | Ongoing polymerization time after emulsion feed [min] | Al(acac)$_3$ [pphm] | Gel$_{irreversible}$ [%] | Gel$_{total}$ [%] | Tg [° C.] |
| C12 | 30 | — | 83 | 83 | about −38 |
| I12a | 10 | 0.75 | 20 | 82.4 | about −38 |

TABLE 6a-continued

| | Gel contents | | | |
|---|---|---|---|---|
| Example | Ongoing polymerization time after emulsion feed [min] | Al(acac)$_3$ [pphm] | Gel$_{irreversible}$ [%] | Gel$_{total}$ [%] | Tg [° C.] |
| I12b | 30 | 0.75 | 33 | 81.6 | about −38 |
| I12c | 60 | 0.75 | 49 | 83.7 | about −38 |

Adhesive foils were produced and the adhesive values were measured (quickstick, peel strength, shear strength, heat stability S.A.F.T. test). The results are set out in Table 6b.

TABLE 6b

| | Performance results | | | | | |
|---|---|---|---|---|---|---|
| | Quickstick [N/25 mm] | | Peel strength [N/25 mm] | Shear strength [h] | | S.A.F.T. |
| Example | Steel | PE | Steel | SC | 70° C. | [° C.] |
| C12 | 11.7 | 8.1 | 11.5 | 0.9 | 0.1 | 98 |
| E12a | 11.8 | 8.3 | 12.2 | 2.6 | 15 | 128 |
| E12b | 12.1 | 8.3 | 12.4 | 1.6 | 7.6 | 125 |
| E12c | 11.6 | 8.4 | 13.4 | 3.1 | 21.7 | 130 |

The examples show that the samples crosslinked with metal salt, in comparison to a purely covalently irreversible crosslinked sample, with comparative total gel content, exhibit better adhesion and cohesion values and also better heat stability (SAFT).

Examples C13, I13-I19 with Different Metal Salts

Polymer dispersions were prepared from the following monomers: 59 parts by weight EHA/15 parts by weight BA/20 parts by weight styrene/5 parts by weight MA/1 part by weight MAA
and admixed with varying amounts of different metal salts (see Table 7).

TABLE 7

Effect of different metal salts on the gel content

| Example | Metal salt | $Gel_{irreversible}$ [%] | $Gel_{total}$ [%] | Tg [° C.] |
|---|---|---|---|---|
| C13 | — | <5 | 0 | about −30 |
| I13 | 1 pphm Al(acac)$_3$ | <5 | 87.9 | about −30 |
| I14 | 1.12 pphm Ti(acac)$_2$ (IPA)$_2$ | <5 | 77.1 | about −30 |
| I15 | 0.88 pphm Zr(IV)(OH/CO$_3$) [1)] | <5 | 30.6 | about −30 |
| I16 | 0.83 pphm Fe(II)ox | <5 | 28.7 | about −30 |
| I17 | 0.55 pphm Fe(II)ox | <5 | 28.4 | about −30 |
| I18 | 1 pphm Zr(IV)(OH/CO$_3$) [1)] | <5 | 22.4 | about −30 |
| I19 | 0.23 pphm Ca(OH)$_2$ | <5 | 15.2 | about −30 |
| C19? | | | | |

[1)] Bacote ® 20

Preferred metal cations are aluminum and titanium, since they bring about the greatest increase in $gel_{total}$. Other metal cations such as zirconium, iron or calcium can also be used, since they likewise produce an increase in $gel_{total}$. They are used preferably in combination with polymers which exhibit a sufficiently high gel content $gel_{irreversible}$, so that $gel_{total}$ is at least 40%.

Examples C20-21, I22-I25 with Copolymerized Zn(MAA)$_2$

Polymer dispersions were prepared from the following monomers:

59 parts by weight EHA/15 parts by weight BA/20 parts by weight styrene/4 to 5 parts by weight MA/0.5 part by weight MAA, and different amounts of Zn(MAA)$_2$ (see Table 8).

TABLE 8

Gel contents

| Example | Zn(MAA)$_2$ [pphm] | $Gel_{irreversible}$ [%] | $Gel_{total}$ [%] | Tg [° C.] |
|---|---|---|---|---|
| C20 | 0 | 0 | 0 | about −30 |
| C21 | 0.36 | 0 | 14.4 | about −30 |
| I22 | 0.73 | 0 | 40.2 | about −30 |
| I23 | 1.09 | 0 | 79.6 | about −30 |
| I24 | 1.45 | 0 | 90.2 | about −30 |
| I25 | ½(0.73 + 1.45) (1:1 blend E22 + E24) | 0 | 77 | about −30 |

Examples I26-I28, C26-C28—Acrylic/Methacrylic Acid Comparison

Emulsion polymers are prepared from the monomers identified in Table 9a and are admixed with 1 pphm Al(acac)$_3$. The quantities are parts by weight.

TABLE 9a

Emulsion polymers - composition

| Example | EHA | BA | S | VAc | HPA | MA | AA | MAA | Al(acac)$_3$ [pphm] |
|---|---|---|---|---|---|---|---|---|---|
| I26 | 77.5 | — | 10 | 8 | 2 | — | — | 2.5 | 1 |
| C26 | 77.5 | — | 10 | 8 | 2 | — | 2.5 | — | 1 |
| I27 | — | 85 | 10 | — | — | — | — | 5 | 1 |
| C27 | — | 85 | 10 | — | — | — | 5 | — | 1 |
| I28 | 59 | 15 | 20 | — | — | 3.5 | — | 2.5 | 1 |
| C28 | 59 | 15 | 20 | — | — | 3.5 | 2.5 | — | 1 |

TABLE 9b

Emulsion polymers - Properties

| Example | $Gel_{irreversible}$ [%] | $Gel_{total}$ [%] | Fine coagulum [1)] 125 μm [g/100 g] | Fine coagulum [2)] 125 μm [g/100 g] | Viscosity | Blushing after 6 h [%] |
|---|---|---|---|---|---|---|
| E26 | 12.7 | 87.3 | 0.010 | 0.019 | Flowable | 2.05 |
| C26 | 76.6 | 88.3 | 0.035 | 0.034 | Pasty Not flowable | 3.99 |
| I27 | 10.6 | 90.1 | 0.005 | 0.003 | | 3.5 |
| C27 | 56.9 | 89.5 | 0.008 | 0.003 | | 13.04 |
| I28 | 0 | 91.4 | 0.005 | 0.004 | | 6.28 |
| C28 | 55.4 | 87.5 | 0.019 | 0.011 | | 6.49 |

[1)] before addition of Al(acac)$_3$

[2)] after addition of Al(acac)$_3$

The examples show that methacrylic acid relative to acrylic acid is advantageous as an acid monomer, since the gel content based on irreversible, covalent crosslinking can be adjusted below 50% only with methacrylic acid, the values for fine coagulum before and after addition of Al(acac)$_3$ tend to be lower, the viscosity tends to be lower, and the blushing stability is improved.

Examples I29-I35, C29-C30

Emulsion polymers were prepared from the amounts of monomers identified in Table 10a and Al(acac)$_3$ and were admixed with 2 wt % of Rheovis® 1420 (thickener). The amount of thickener was 1 wt % for I30 and I31 and 2.5 wt % for I32. The quantities are parts by weight.

TABLE 10a

Emulsion polymers (quantities in parts by weight)

| Example | EHA | BA | S | VAc | EA | MA | MAA | Al(acac)$_3$ [pphm] | Gel-$_{irreversible}$ [%] | Gel-$_{total}$ [%] |
|---|---|---|---|---|---|---|---|---|---|---|
| I29 | 57 | 0 | 10 | 5 | 25 | | 3 | 1 | <5 | 83 |
| C29 | 57 | 0 | 10 | 5 | 25 | | 3 | — | <5 | <5 |
| I30 | 52 | | 10 | | 35 | | 3 | 1 | <5 | 80.5 |
| C30 | 52 | | 10 | | 35 | | 3 | — | <5 | <5 |
| I31 | 57 | | 20 | 5 | 15 | | 3 | 1 | <5 | 84 |
| I32 | 45.5 | 30 | 10 | | | 12 | 2.5 | 1 | <5 | 84.4 |
| I33 | 64.5 | 8 | 15 | | | 10 | 2.5 | 1 | <5 | 83.5 |
| I34 | 58.25 | | 10 | 5 | 25 | | 1.75 | 1 | <5 | 81.5 |
| I35 | 59 | 15 | 20 | | | 5 | 1 | 1 | <5 | 81.7 |

Adhesive foils were produced from plasticized PVC. The performance properties are set out in Table 10b.

TABLE 10b

Performance properties

| Example | Shear strength [h] | Shear strength 3 d/70° C. [h] | Gap width $^{1)}$ 5 d/70° C. [mm] | Shrinkage $^{2)}$ 3 d/70° C. [%] |
|---|---|---|---|---|
| I29 | >100 | >100 | 0.1 vert. 0.1 horiz. | 0.1 width 0.2 length |
| C29 | 33.1 | 26.4 | 2.0 vert. 2.4 horiz. | 0.7 width 0.9 length |
| I30 | >100 | >100 | 0.1 vert. 0.1 horiz. | 0.1 width 0.2 length |
| C30 | 69.8 | 58.9 | 1.3 vert. 1.5 horiz. | 0.5 width 0.6 length |
| I31 | >100 | >100 | 0.1 vert. 0.1 horiz. | 0.2 width 0.3 length |
| I32 | >100 | >100 | 0.1 vert. 0.1 horiz. | 0.2 width 0.2 length |
| I33 | >100 | >100 | 0.1 vert. 0.1 horiz. | 0.1 width 0.2 length |
| I34 | 86 >100 | >100 | 0.1 vert. 0.1 horiz. | 0.2-0.3 width 0.3-0.4 length |
| I35 | >100 | >100 | 0.1 vert. 0.1 horiz. | 0.4 width 0.5 length |

$^{1)}$ Measurement method: plasticizer resistance, cross-cut
$^{2)}$ Measurement method: laminate shrinkage

The invention claimed is:

1. A one-component pressure-sensitive adhesive composition in the form of an aqueous polymer dispersion comprising at least one pressure-sensitive adhesive polymer formed by emulsion polymerization of
   (i) at least 60 wt %, based on the sum of the monomers, of at least one soft (meth)acrylic ester monomer which when polymerized as a homopolymer has a glass transition temperature of less than 0° C.,
   (ii) 0.1 to 10 wt %, based on the sum of the monomers, of methacrylic acid,
   (iii) 10 to 25 wt %, based on the sum of the monomers, of styrene,
   (iv) optionally one or more further monomers, different from (i) to (iii),
   where the polymerization takes place in the presence of 0 to 1 parts by weight of chain transfer agent per 100 parts by weight of monomers,
   where the pressure-sensitive adhesive polymer has a gel content of at least 40 wt %, based on a polymer film produced from the pressure-sensitive adhesive polymer,
   where the gel content is based at least partly on a reversible crosslinking by metal salts, and the gel content of the pressure-sensitive adhesive polymer that is based on reversible crosslinking by metal salts is at least 10 wt %,
   where the metal salts which bring about the reversible crosslinking are used in uncoated form,
   where the gel content may also be based partly on covalent, irreversible crosslinking, and the gel content of the pressure-sensitive adhesive polymer that is based on covalent, irreversible crosslinking is 0 to 50 wt %, and
   where the glass transition temperature of the polymer is less than 0° C.

2. The pressure-sensitive adhesive composition according to claim 1, wherein the soft (meth)acrylic ester monomer is selected from the group consisting of n-butyl acrylate, 2-ethylhexyl acrylate, and ethyl acrylate.

3. The pressure-sensitive adhesive composition according to claim 1, wherein the pressure-sensitive adhesive polymer is formed from 65 to 99.5 wt %, based on the sum of the monomers, of at least one soft (meth)acrylic ester monomer selected from the group consisting of n-butyl acrylate and 2-ethylhexyl acrylate.

4. The pressure-sensitive adhesive composition according to claim 1, wherein the pressure-sensitive adhesive polymer is formed from 0.5 to 6 wt %, based on the sum of the monomers, of methacrylic acid.

5. The pressure-sensitive adhesive composition according to claim 1, wherein the one or more optional monomers (iv) are used in amounts of 0 to 10 wt %, based on the sum of the monomers, and are selected from the group consisting of C1 to C20 alkyl (meth)acrylates, monomers comprising hydroxyl groups, vinyl esters of carboxylic acids, comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, which are different from the monomers (i) to (iii).

6. The pressure-sensitive adhesive composition according to claim 1, wherein the crosslinking via metal salts takes place by addition of at least one metal salt after the polymerization, where the molar ratio of metal cations to carboxylate groups of the polymer is 1 to 300 mol % or wherein the crosslinking via metal salts takes place by copolymerization with at least one metal salt monomer having an at least divalent metal cation.

7. The pressure-sensitive adhesive composition according to claim 1, wherein the polymerization takes place in the presence of 0.01 to 0.75 part by weight of chain transfer agent per 100 parts by weight of monomers.

8. The pressure-sensitive adhesive composition according to claim 1, wherein the gel content of the pressure-sensitive adhesive polymer that is based on reversible crosslinking by metal salts is at least 40 wt %,
and the gel content of the pressure-sensitive adhesive polymer that is based on covalent, irreversible crosslinking is greater than 0 and up to 30 wt %.

9. The pressure-sensitive adhesive composition according to claim 1, wherein the metal cations of the metal salts are selected from the group consisting of $Al^{3+}$, $Zn^{2+}$, $Ti^{4+}$, $Ca^{2+}$, $Fe^{3+}$ and $Ze^{4+}$.

10. The pressure-sensitive adhesive composition according to claim 1, wherein the crosslinking via metal salts takes place by addition of at least one metal salt after the polymerization, and the metal salt is selected from the group consisting of zinc salts and aluminum salts, or wherein the crosslinking via metal salts takes place by copolymerization with zinc (meth)acrylate or aluminum (meth)acrylate.

11. The pressure-sensitive adhesive composition according to claim 1, wherein the pressure-sensitive adhesive composition comprises at least one tackifier.

12. The pressure-sensitive adhesive composition according to claim 1, wherein the pressure-sensitive adhesive polymer is formed from
(i) at least 65 wt %, based on the sum of the monomers, of at least one acrylic ester monomer selected from the group consisting of n-butyl acrylate and 2-ethylhexyl acrylate,
(ii) 0.5 to 8 wt %, based on the sum of the monomers, of methacrylic acid,
(iii) 10 to 25 wt %, based on the sum of the monomers, of styrene,
(iv) 0 to 10 wt %, based on the sum of the monomers, of monomers selected from the group consisting of C1 to C20 alkyl (meth)acrylates, monomers comprising hydroxyl groups, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, which are different from the monomers (i) to (iii),
where the pressure-sensitive adhesive polymer has a gel content of at least 50 wt %, based on the polymer film,
where the gel content of the pressure-sensitive adhesive polymer that is based on reversible crosslinking by metal salts is at least 40 wt %,
where the gel content of the pressure-sensitive adhesive polymer that is based on covalent, irreversible crosslinking is greater than 0 and up to 30 wt %,
where the metal cations of the metal salts are selected from the group consisting of $Al^{3+}$, $Zn^{2+}$, $Ti^{4+}$, $Ca^{2+}$, $Fe^{3+}$ and $Zr^{4+}$, and
where the glass transition temperature of the polymer is less than −20° C.

13. A self-adhesive article coated with the one-component pressure-sensitive adhesive composition according to claim 1.

14. A method for producing a self-adhesive article by coating a substrate with the one-component pressure-sensitive adhesive composition according to claim 1.

15. A one-component pressure-sensitive adhesive composition in the form of an aqueous polymer dispersion comprising at least one pressure-sensitive adhesive polymer formed by emulsion polymerization of
(i) at least 60 wt %, based on the sum of the monomers, of at least one soft (meth)acrylic ester monomer which when polymerized as a homopolymer has a glass transition temperature of less than 0° C.,
(ii) 0.1 to 10 wt %, based on the sum of the monomers, of methacrylic acid,
(iii) 0 to 30 wt %, based on the sum of the monomers, of styrene,
(iv) optionally one or more further monomers, different from (i) to (iii),
where the polymerization takes place in the presence of 0 to 1 parts by weight of chain transfer agent per 100 parts by weight of monomers,
where if no chain transfer agent is used, the amount of styrene (iii) is at least 5 wt %,
where the pressure-sensitive adhesive polymer has a gel content of at least 40 wt %, based on a polymer film produced from the pressure-sensitive adhesive polymer,
where the gel content is based at least partly on a reversible crosslinking by metal salts, and the gel content of the pressure-sensitive adhesive polymer that is based on reversible crosslinking by metal salts is at least 10 wt %,
where the metal salts which bring about the reversible crosslinking are used in uncoated form,
where the gel content may also be based partly on covalent, irreversible crosslinking, and the gel content of the pressure-sensitive adhesive polymer that is based on covalent, irreversible crosslinking is 0 to 50 wt %,
where the glass transition temperature of the polymer is less than 0° C.,
and wherein the crosslinking via metal salts takes place by copolymerization with at least one metal salt monomer having an at least divalent metal cation.

\* \* \* \* \*